United States Patent
Joung et al.

(10) Patent No.: US 6,825,583 B2
(45) Date of Patent: Nov. 30, 2004

(54) LINEAR MOTOR INCLUDING COOLING SYSTEM

(75) Inventors: Jae-Han Joung, Daegu (KR); Jae-Wan Park, Daegu (KR)

(73) Assignee: Samick LMS Co., LTD, Daegu (KR)

( * ) Notice: Subject to any disclaimer, the term of this patent is extended or adjusted under 35 U.S.C. 154(b) by 0 days.

(21) Appl. No.: 10/470,492

(22) PCT Filed: Jul. 6, 2002

(86) PCT No.: PCT/KR02/01286

§ 371 (c)(1),
(2), (4) Date: Jul. 29, 2003

(87) PCT Pub. No.: WO03/005538

PCT Pub. Date: Jan. 16, 2003

(65) Prior Publication Data

US 2004/0070290 A1 Apr. 15, 2004

(30) Foreign Application Priority Data

Jul. 6, 2001 (KR) .................. 10-2001-0040214

(51) Int. Cl.[7] ............ H02K 41/00; H02K 33/00; H02K 35/00; H02K 9/00
(52) U.S. Cl. .............. 310/16; 310/12; 310/52
(58) Field of Search ............ 310/12–39, 52–65

(56) References Cited

U.S. PATENT DOCUMENTS

| | | | |
|---|---|---|---|
| 3,675,757 A | | 7/1972 | Yabuta |
| 4,839,545 A | * | 6/1989 | Chitayat .................. 310/12 |
| 5,565,718 A | * | 10/1996 | Takei ...................... 310/12 |
| 5,751,077 A | * | 5/1998 | Gonzalez ................. 310/12 |
| 5,850,112 A | * | 12/1998 | Sienz et al. .............. 310/12 |
| 5,910,691 A | * | 6/1999 | Wavre ..................... 310/12 |
| 6,114,781 A | * | 9/2000 | Hazelton et al. ......... 310/12 |
| 6,336,744 B1 | * | 1/2002 | Rehm et al. .............. 384/59 |
| 6,661,124 B1 | * | 12/2003 | Seki et al. ................ 310/12 |
| 6,661,130 B2 | * | 12/2003 | Yamazaki et al. ........ 310/12 |
| 6,664,665 B2 | * | 12/2003 | Hsiao ...................... 310/12 |
| 2001/0035686 A1 | * | 11/2001 | Hwang et al. ............ 310/12 |
| 2002/0149270 A1 | * | 10/2002 | Hazelton .................. 310/12 |
| 2003/0025403 A1 | * | 2/2003 | Hsiao ...................... 310/12 |
| 2003/0230941 A1 | * | 12/2003 | Jacobs ..................... 310/12 |

FOREIGN PATENT DOCUMENTS

| | | | |
|---|---|---|---|
| JP | 1315249 | 12/1989 | |
| JP | 06165472 | * 6/1994 | ...... H02K/41/035 |
| JP | 06165474 | * 6/1994 | ...... H02K/41/035 |
| JP | 10323012 | 12/1998 | |
| JP | 11252863 | 9/1999 | |
| JP | 201128438 | 5/2001 | |

* cited by examiner

Primary Examiner—Burton S. Mullins
Assistant Examiner—Heba Y. Elkassabgi
(74) Attorney, Agent, or Firm—Blank Rome LLP

(57) ABSTRACT

Disclosed is an iron core type linear motor, and more particularly an iron core type linear motor with an improved cooling system for an easy manufacture thereof while having a high cooling efficiency. The iron core type linear motor includes a moving part including a core, a coil, and an upper plate, and a stator including magnets, and a magnet fixing plate. The iron core type linear motor according to the present invention is characterized by a cooling system including a lower cooling conduit, a thermal insulating plate, and an upper cooling conduit laminated over one another in this order between the core and the upper plate.

7 Claims, 1 Drawing Sheet

LINEAR MOTOR INCLUDING COOLING SYSTEM

This application claims priority to WO 03/00538, filed Jul. 6, 2002 and KR11-0432244, filed Jul. 6, 2001.

TECHNICAL FIELD

The present invention relates to an iron core type linear motor, and more particularly to an iron core type linear motor with an improved cooling system for an easy manufacture thereof while having a high cooling efficiency.

BACKGROUND ART

An example of a conventional linear motor is disclosed in U.S. Pat. No. 5,850,112 (related to a heat release structure of such a linear motor). The disclosed linear motor includes a fluid cooling system including a primary cooling circuit and a secondary cooling plate arranged above a heat generating part of the linear motor, that is, a core, to prevent heat generated from the linear motor from being externally transferred, and an air cooling system including heat radiating fins surrounding a moving part of the linear motor to prevent residual heat from being externally radiated.

However, the above mentioned technique has various problems as follows.

First, the secondary cooling plate of the fluid cooling system is made of a flat metal plate formed with a circulating path for a cooling fluid in accordance with a drilling or boring process. However, where a plurality of elongated horizontal holes are formed through the flat metal plate in accordance with a drilling or boring process, the tip of the machining tool used in the machining process may be broken during the machining process due to the features of the machining process. Otherwise, the machining device used in the machining process may be damaged due to an increased load applied to the spindle of the machining device.

Second, adjacent ones of the elongated holes in the second cooling plate are connected to each other at their ends by connecting members, in order to allow circulation of a cooling fluid. For this reason, the manufacturing and installation costs are increased.

Third, the air cooling system is configured to prevent convection and radiation heat generated from the core from being externally transferred by use of heat radiating fins. However, this structure can cut off only the radiation heat directly transferred to external equipment through the heat radiating fins. For this reason, it is impossible to reduce the amount of heat emitted from the surface of the moving part. The heat emitted from the surface of the moving part heats the air surrounding the linear motor, thereby causing the linear motor to be heated. As a result, the linear motor may operate erroneously or exhibit a degradation in efficiency. Furthermore, the provision of the heat radiating fins causes an increase in the size of the linear motor. For this reason, this linear motor exhibits low utility.

DISCLOSURE OF INVENTION

The present invention provides an iron core type linear motor comprising a moving part including a core, coils, and an upper plate, and a stator including magnets, and a magnet fixing plate, further comprising:

a cooling system including a lower cooling conduit, a thermal insulating plate, and an upper cooling conduit laminated over one another in this order between the core and the upper plate.

In accordance with the present invention, the linear motor with the above described cooling system is characterized by heat shield plates respectively arranged at opposite side surfaces of the moving part to prevent heat from being transferred to the side surfaces of the moving part.

In accordance with the configuration according to the present invention, it is possible to efficiently prevent heat generated from the linear motor from being transferred to the surroundings, and to easily manufacture the linear motor using a simple assembly process.

Figure 1:
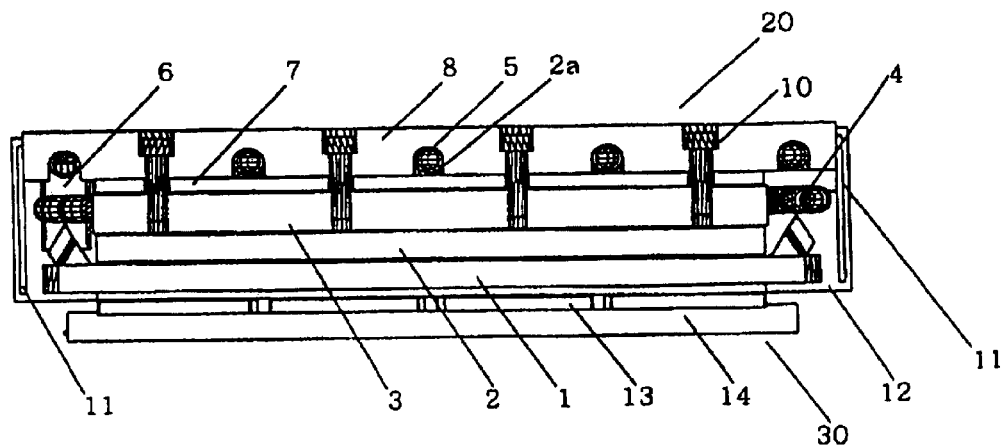
FIG. 1 is a sectional view illustrating the overall structure of an iron core type linear motor according to the present invention.

EXPLANATION OF REFERENCE NUMERALS DESIGNATING THE MAJOR ELEMENTS OF THE DRAWINGS 1. coil
2. core
2a. U-shape groove
3. T-shape nut
4. lower cooling conduit
5. upper cooling conduit
6. conduit connecting block
7. thermal insulating plate
8. upper plate
9. manifold
9a. inlet port
9b. outlet port
10. bolt
10a. fixing holes
11. heat shield plates
12. molding resin
13. magnet
14. magnet fixing plate
20. moving part
30. stator

BEST MODE FOR CARRYING OUT THE INVENTION

Now, preferred embodiments of the present invention will be described in detail with reference to the annexed drawings.

FIG. 1 is a sectional view illustrating the overall structure of an iron core type linear motor according to the present invention. As shown in FIG. 1, the linear motor basically includes a moving part 20, and a single-sided stator 30, and further includes cooling system as follows. The moving part 20 includes an iron core 2, coils 1 supplied with current, and an upper plate 8, whereas the stator 30 includes magnets 13 longitudinally arranged on a magnet fixing plate 14 such that N and S poles are adjacent to each other.

Figure 2:
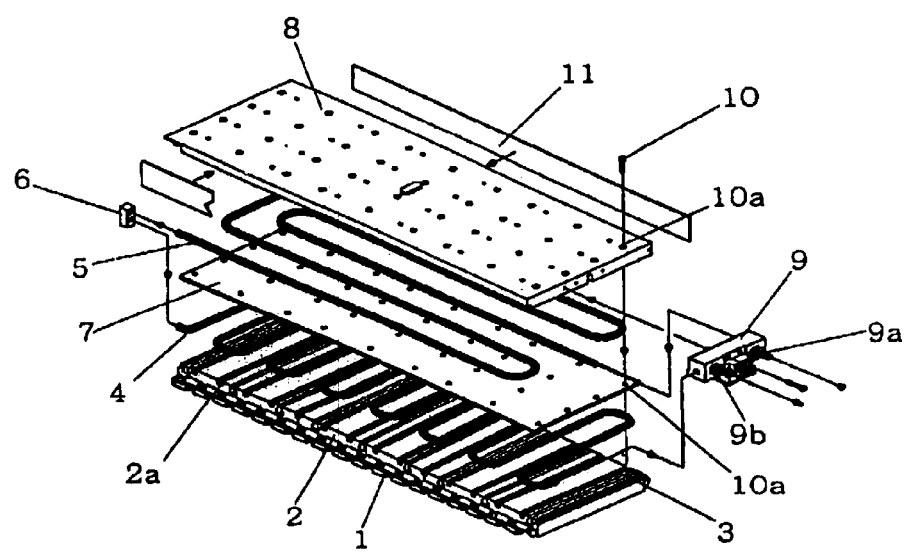
FIG. 2 is an exploded perspective view illustrating a cooling system for a moving part according to the present invention.

FIG. 2 is an exploded perspective view illustrating a cooling system for the moving part according to the present invention. The cooling system of the linear motor according to the present invention will be described in conjunction with FIGS. 1 and 2.

In the linear motor according to the present invention, its cooling system includes a lower cooling conduit 4 arranged such that it is in close contact with the core 2, and adapted to conduct a main cooling operation for the linear motor, a thermal insulating plate 7 for cutting off residual heat from the lower cooling conduit 4, and an upper cooling conduit 5 for cooling the upper plate 8. The constituting elements 4, 7 and 5 of the cooling system are arranged between the coil 1 of the moving part 20 and the upper plate 8 such that they are laminated over one another in the order of the lower cooling conduit 4—the thermal insulating plate 7—the upper cooling conduit 5.

The thermal insulating plate 7 may be made of a resin material having a superior thermal insulating ability such as TEFLON, urethane, or rubber. The thickness of the thermal insulating plate 7 may be appropriately determined in accordance with the amount of heat generated from the core or the designed dimension of the core.

The thermal insulating plate 7 cuts off the transfer path of heat. As a result, only a small portion of the heat is transferred to the upper plate 8 via the thermal insulating plate 7 and epoxy resin under the condition in which a large portion of the heat remains below the thermal insulating plate 7. That is, a primary cooling region where the generated heat is mainly cooled is defined below the thermal insulating plate 7, whereas a secondary cooling region where a small amount of residual heat is cooled is defined above the thermal insulating plate 7.

Accordingly, the lower cooling conduit 4 is arranged at the region defined below the thermal insulating plate 7 and required for the cooling of a large amount of heat, whereas the upper cooling conduit 5 is arranged at the region defined above the thermal insulating plate 7 and required only for the cooling of a small amount of residual heat.

In the illustrated embodiment of the present invention, the upper and lower cooling conduits 4 and 5 are arranged to cross each other, that is, to have a lattice shape, as shown in FIGS. 1 and 2. In accordance with such an arrangement, it is possible to uniformly cool the entire surface of the moving part 20 which is a linear motor part to be cooled.

U-shaped grooves 2a are formed at the upper surface of the core 2 being in contact with the lower cooling conduit 4, in order to receive the lower cooling conduit 4. Similarly, U-shaped grooves 2a are formed at the lower surface of the upper plate 8 being in contact with the upper cooling conduit 5, in order to receive the upper cooling conduit 5. The formation of these U-shaped grooves 2a may be achieved by a boring process. In accordance with this configuration, it is possible to achieve an increase in mechanical rigidity and an increase in space utility. Also, the area of each cooling conduit contacting the associated part to be cooled is increased, thereby achieving an efficient cooling operation and a stable fixing effect.

The lower and upper cooling conduits 4 and 5 are communicated with each other by a conduit connecting block 6. A manifold 9 having an inlet port 9a and an outlet port 9b is connected to the inlet end of the upper cooling conduit 5 and the outlet end of the lower cooling conduit 4, respectively. Thus, the cooling fluid discharged from a cooling unit (not shown) is circulated through a circulation path connected to a reservoir tank (not shown) via the inlet port 9a of the manifold 9, the upper cooling conduit 5, the conduit connecting block 6, the lower cooling conduit 4, and the outlet port 9b of the manifold 9, in this order, thereby cooling the linear motor.

Preferably, the upper and lower cooling circuits 4 and 5 are made of a material having a superior thermal conductivity, for example, copper or stainless steel, so as to achieve a rapid heat exchange between the cold fluid of the cooling conduits and the heat of the core 2 or upper plate 8.

For the cooling fluid, various fluids such as cooling water, cooling oil, and air may be used. However, cooling water or oil having a high specific heat capacity may be preferably used.

In accordance with the illustrated embodiment of the present invention, the laminated cooling system is firmly held between the core 2 and the upper plate 8 by use of T-shaped bolts 3 and nuts 10. And they are integrated by molding with epoxy resin.

That is, fixing holes 10a are formed through the upper plate 8 and the thermal insulating plate 7. The T-shaped bolts 3 are inserted into the fixing holes 10a, and then coupled with the nuts 10, thereby connecting the core 2 and the upper plate 8. Since the core 2 and the upper plate 8 are connected to each other by the T-shaped bolt 3 and nuts 10, heat transfer is carried out via the T-shaped bolts 3 and nuts 10. As a result, the heat from the core 2 is transferred to the upper plate 8.

In order to avoid such a phenomenon, it is desirable to manufacture the T-shaped bolts 3 and nuts 10 using a material having a thermal insulating ability, or to wrap a thermal insulating tape around the T-shaped bolts 3.

Although the above described cooling system can effectively prevent heat release in the upward direction from the moving part in that the heat generated from the core 2 is rapidly cooled by the lower and upper cooling conduits 4 and 5, this structure cannot provide a cooling effect in the lateral direction of the moving part. In this case, heat may be emitted from the side surfaces of the moving part, thereby heating air surrounding the moving part. As a result, the linear motor or electronic appliances arranged around the linear motor may operate erroneously.

In order to avoid such a problem, heat shield plates 11 are arranged at left and right side surfaces of the moving part in such a fashion that they are connected to the upper plate 8 in accordance with the illustrated embodiment of the present invention. The heat shield plates 11 cut off heat from the moving part in order to prevent the heat from being externally discharged. In this case, the cut-off heat is transferred to the upper plate 8 via the heat shield plates 11, so that it is rapidly cooled by cold fluid of the upper cooling conduit 5. The heat shield plates 11 may be made of a material having a high thermal conductivity.

INDUSTRIAL APPLICABILITY

As apparent from the above description, the cooling system of the present invention carries out a cooling operation through upper and lower cooling conduits thermally insulated from each other by a thermal insulating plate, as compared to the conventional cooling system in which cooling is carried out through a primary cooling circuit and a secondary cooling plate. Accordingly, the cooling efficiency of the cooling system is maximized. Using this cooling system, it is possible to manufacture a linear motor with a high thrust and a high accuracy by a simple assembly process.

In accordance with a preferred embodiment of the present invention, heat shield plates are arranged at respective side surfaces of the moving part of the linear motor in order to prevent heat from being externally discharged. Accordingly, it is possible to prevent the linear motor or electronic appliances arranged around the linear motor from operating erroneously.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An iron core type linear motor comprising a moving part including a core, coils, and an upper plate, and a stator including magnets, and a magnet fixing plate, further comprising:

a cooling system including a lower cooling conduit, a thermal insulating plate, and an upper cooling conduit laminated over one another in this order between the core and the upper plate.

2. The iron core type linear motor according to claim 1, further comprising:

heat shield plates arranged at opposite side surfaces of the moving part.

3. The iron core type linear motor according to claim 1, wherein the lower and upper cooling conduits are arranged in a laminated state to have a lattice shape.

4. The iron core type linear motor according to claim 1, wherein the lower and upper cooling conduits are separately manufactured, and connected to each other by a conduit connecting block.

5. The iron core type linear motor according to claim 1, wherein the core is provided at an upper surface thereof with U-shaped grooves for receiving the lower cooling conduit, and the upper plate is provided at a lower surface thereof with U-shaped grooves for receiving the upper cooling conduit.

6. The iron core type linear motor according to claim 1, wherein the parts between core and the upper plate are fastened to each other by T-shaped bolts and nuts made of a material having a thermal insulating ability or wrapped with a thermal insulating tape around outer surfaces thereof.

7. The iron core type linear motor according to claim 1, wherein the moving part is molded with epoxy resin so that the cooling system is integral with the moving part.

* * * * *